No. 778,036.  
Patented December 20, 1904.

UNITED STATES PATENT OFFICE.

EDUARD HEPP, OF FRANKFORT-ON-THE-MAIN, AND RUDOLF UHLENHUTH, OF HÖCHST-ON-THE-MAIN, GERMANY, ASSIGNORS TO FARBWERKE, VORM. MEISTER, LUCIUS & BRÜNING, OF HÖCHST-ON-THE-MAIN, GERMANY, A CORPORATION OF GERMANY.

ANTHRAQUINONE DYE AND PROCESS OF MAKING SAME.

SPECIFICATION forming part of Letters Patent No. 778,036, dated December 20, 1904.

Application filed June 27, 1904. Serial No. 214,272. (Specimens.)

*To all whom it may concern:*

Be it known that we, EDUARD HEPP, Ph. D., residing at Frankfort-on-the-Main, and RUDOLF UHLENHUTH, Ph. D., residing at Höchst-on-the-Main, Germany, chemists, both citizens of the Empire of Germany, have invented a certain new and useful Anthraquinone Dyestuff, of which the following is a specification.

Our invention relates to the production of new green dyestuffs by acting with sulfonating agents on 1.4-dialphylido-5-oxy-anthraquinones having the general formula

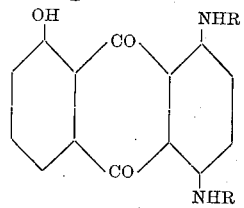

in which "R" represents an aromatic radical, such as phenyl, tolyl, xylyl, and the like.

The said dialphylido-oxy-anthraquinones may be prepared by condensing 1.4.5-trioxy-anthraquinone hydrid with aromatic amins in presence of the oxygen of the air, the trioxy-anthraquinone hydrid being obtained, for instance, as follows: The 1.5 and 1.8-nitroanthraquinone-sulfonic acids are transformed into the corresponding methoxyanthraquinone-sulfonic acids by means of a solution of caustic alkalies in methyl alcohol. These methoxyanthraquinone-sulfonic acids are then converted into the 1.4.5-trioxy-anthraquinone by nitrating them, reducing the products thus obtained, and heating under pressure the corresponding amido-oxy-anthraquinone-sulfonic acids in a closed vessel with hydrate of lime. By heating the trioxy-anthraquinone with stannous chlorid and crystallizing the product from benzene the trioxy-anthraquinone hydrid is obtained in the shape of orange red prisms soluble in concentrated sulfuric acid with a yellow color and melting at 210° centigrade. It is soluble in dilute caustic alkalies with a yellow color which becomes violet by the oxygen of the air.

The new dyestuff sulfonic acids represent when dry and pulverized dark-green powders very easily soluble in water, the aqueous solution remaining unchanged on adding sodium carbonate, but turning somewhat more bluish on adding caustic alkali. They dye unmordanted and chrome-mordanted wool and chrome-mordanted cotton green shades very fast to light acids and alkalies.

To carry out our process, we proceed, for instance, as follows:

Example: Ten kilos of 1.4.5-trioxy-anthraquinone hydrid are heated with sixty kilos of para-toluidin and ten kilos of boric acid for about two hours to 115° centigrade. The mass still warm is diluted with methyl alcohol, the separated product of condensation is filtered, washed with alcohol, and dried. It represents blue-black needles of metallic luster melting at 239° centigrade. It is soluble with great difficulty in indifferent solvents, soluble in alcohol in presence of alkalies with a green-blue color. In concentrated sulfuric acid it yields a blue solution which on being diluted with water becomes green, a green precipitate being separated.

To manufacture the sulfonic acid, one part, by weight, of 1.4-di-para-toluido-5-oxy-anthraquinone is introduced at ordinary temperature into ten parts, by weight, of fuming sulfuric acid containing five per cent. of anhydrid and the mixture is allowed to stand until a test portion diluted with water gives no precipitate. The mass is then poured into water, the sulfuric acid is eliminated with hydrate of lime, and the sodium salt obtained in the usual manner is evaporated to dryness. It is a green powder readily soluble in water with a green color, dyeing unmordanted wool green shades of remarkable fastness to light and alkali. Other of the above-defined 1.4-dialphylido-5-oxy-anthraquinones are transformed in a similar manner into the corresponding sulfonic acids.

Having now described our invention, what we claim is—

1. The process for producing new anthraquinone dyestuffs, which consists in treating 1.4-dialphylido-5-oxy-anthraquinones having the general formula:

wherein "R" represents an aromatic radical, such as phenyl, tolyl, xylyl and the like, with sulfonating agents.

2. The process for producing a new anthraquinone dyestuff, which consists in treating 1.4-di-para-toluido-5-oxy-anthraquinone having the formula:

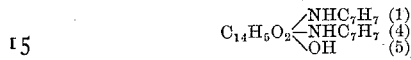

with sulfonating agents.

3. The herein-described new anthraquinone dyestuffs, obtainable by sulfonating 1.4-dialphylido-5-oxy-anthraquinones having the general formula:

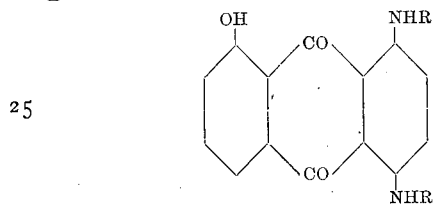

which dyestuffs, when dry and pulverized, are green powders, soluble in water with a green color, dyeing unmordanted and chrome-mordanted wool and chrome-mordanted cotton green shades, very fast to light, acids and alkalies.

4. The herein-described new anthraquinone dyestuff, obtainable by sulfonating 1.4-di-para-toluido-5-oxy-anthraquinone, having the formula

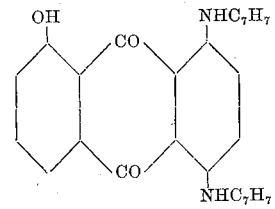

which dyestuff in the shape of its sodium salt represents when dry and pulverized, a green powder soluble in water with a green color, the solution of which remains unchanged by adding sodium carbonate, but turns somewhat more bluish by caustic alkalies, soluble in concentrated sulfuric acid with a green color and dyeing unmordanted and chrome-mordanted wool and chrome-mordanted cotton green shades, very fast to light, acids and alkalies.

In testimony that we claim the foregoing as our invention we have signed our names in presence of two subscribing witnesses.

EDUARD HEPP.
RUDOLF UHLENHUTH.

Witnesses:
JOHANN HARTENSTEIN,
JOSEPH BLACK.